United States Patent [19]

Kulakowski et al.

[11] Patent Number: 5,511,228
[45] Date of Patent: Apr. 23, 1996

[54] APPARATUS AND METHOD FOR EMPLOYING A HOST MODE SETTING COMMAND TO TURN-OFF OR LEAVE-ON A LASER IN AN OPTICAL DISK DRIVE

[75] Inventors: John E. Kulakowski; Rodney J. Means; Gary R. Stephens, all of Tucson, Ariz.

[73] Assignee: International Business Machines Corporation, Armonk, N.Y.

[21] Appl. No.: 29,313

[22] Filed: Mar. 8, 1993

Related U.S. Application Data

[63] Continuation of Ser. No. 882,731, May 14, 1992, abandoned, which is a continuation of Ser. No. 591,320, Oct. 1, 1990, abandoned.

[51] Int. Cl.⁶ .................................. G11B 7/00; G11B 7/08
[52] U.S. Cl. .................... 395/834; 395/828; 369/116; 364/DIG. 1; 364/232.9; 364/236.2; 364/249.4; 364/249.8
[58] Field of Search .................... 369/44.27, 116, 369/49.24, 49.27, 100, 116; 371/16.3, 61, 62; 395/275, 775, 375, 425, 700, 800

[56] References Cited

U.S. PATENT DOCUMENTS

| 4,466,087 | 8/1984 | Cheng | 369/45 |
|---|---|---|---|
| 4,499,571 | 2/1985 | Yokota | 369/54 |
| 4,717,968 | 1/1988 | Painton et al. | 358/310 |
| 4,982,397 | 1/1991 | Yokota | 369/116 |
| 4,989,194 | 1/1991 | Aoi | 369/44.27 |
| 4,999,721 | 3/1991 | Ogawa | 360/74.1 |
| 5,012,435 | 11/1991 | Bailey | 364/569 |
| 5,136,569 | 8/1992 | Fennema et al. | 369/58 |
| 5,185,734 | 2/1993 | Call et al. | 369/116 |
| 5,327,414 | 7/1994 | Makino et al. | 369/116 |

*Primary Examiner*—Thomas C. Lee
*Assistant Examiner*—Lance L. Barry
*Attorney, Agent, or Firm*—H. F. Sommermeyer

[57] ABSTRACT

In an optical disk drive, upon each power on or disk receipt, a mode control is set to non-operate, i.e., no commands can be received unless a mode setting command has been received. All other commands are rejected for preventing any access to an optical disk present in the drive until after a mode setting command has been received. When a mode set command is received after a power on or after each disk receipt, the mode control is set to operate which allows receipt and execution of legal commands. The mode setting requirement forces selection of write verify or not and to turn laser off or not after a predetermined time delay after completing a last command.

6 Claims, 2 Drawing Sheets

LEGEND:
WV – WRITE VERIFY
LO – LASER OFF
PF – PAGE FORMAT
SP – SAVE PARAMETER

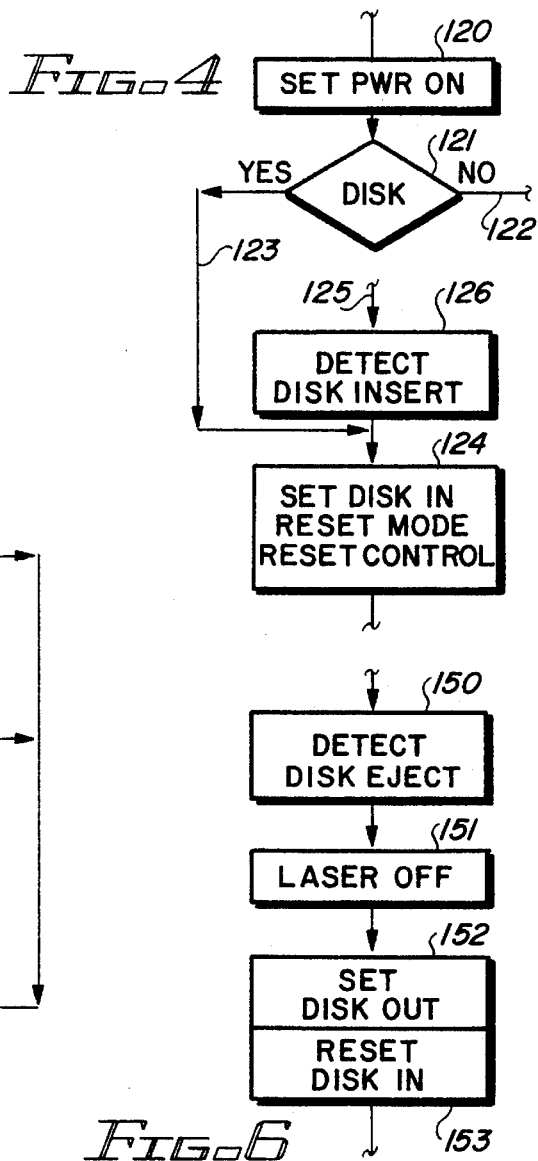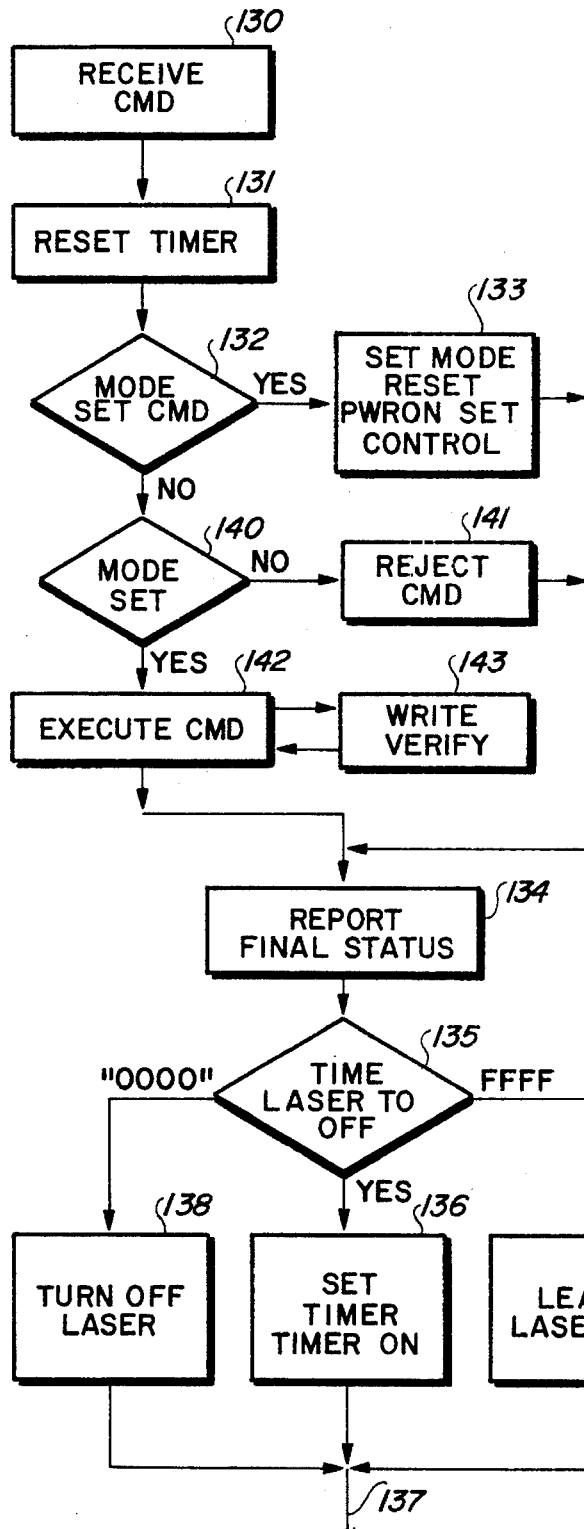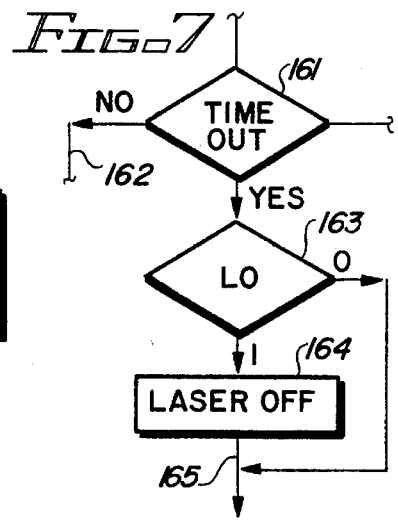

APPARATUS AND METHOD FOR EMPLOYING A HOST MODE SETTING COMMAND TO TURN-OFF OR LEAVE-ON A LASER IN AN OPTICAL DISK DRIVE

RELATED APPLICATIONS

This application is a continuation of Ser. No. 07/882,731, filed 05/14/92, now abandoned, which is a continuation of Ser. No. 07/591,320 filed 10/1/90, now abandoned.

FIELD OF THE INVENTION

The present invention relates to data processing systems, more particularly to controlling peripheral data storage systems such as those using optical disk drives.

BACKGROUND OF THE INVENTION

In those optical disk drives employing magnetooptic (MO) media, data integrity is limited due to possible deterioration of the MO media during its life. That is, there are a large number of media errors at the beginning of life or MO media. Additional media errors may occur (grow) during lifetime of such disk. Even though MO media for data storage is a relatively recent vintage, and there is a lack of media error statistics for such media, it is apt that error rates at the beginning of life and end of life improves as more and more of such media is employed. For ensuring adequate data integrity and reliability, verify on write commands are needed. When media reliability improves, such verify on write may be dispensed with. It is desired to provide automatic means for invoking or disabling the verify on write. The verify on write is a read operation immediately following a write operation requiring one additional rotation of the MO disk. It is desired, if possible, to eliminate this time delay in verifying that data has been successfully recorded on peripheral medium.

A second problem occurring in optical disk using MO media is related to lifetime of a laser. A laser generates a beam which not only records data on the MO media but also enables reading of such data. Again, the use of solid state lasers such as gallium-arsenide lasers is relatively new and laser life statistics in the optical disk environment are not plentiful. Leaving the laser on tends to decrease the effective life of the laser. It is desired to provide for laser turnoff for maintaining a maximal life of a laser. Automatic selection of the above two described reliability enhancing operations is desired.

DISCUSSION OF PRIOR ART

U.S. Pat. No. 4,435,762 shows a tape recording system which uses a mode set command which is active during a chain of commands. A chain of commands is determined by a connected host processor and defines the type of operation to be performed in the peripheral system during a chain of commands. The chain of command is those commands which are related together as one major operation of the host processor and which is identified to peripheral equipment. Several of such chains of commands are used in connection with recording and reading data onto and from a magnetic tape or other peripheral medium. Such mode set command usually lasts only for the duration of the chain of commands; a single chain of commands may have additional mode set commands which change the mode of operation within a chain of commands.

SUMMARY OF THE INVENTION

In accordance with the present invention, an optical disk drive has a mode state that indicates either an operate or non-operate condition. Both conditions, including the non-operate condition occur after completion of power-on sequencing. The non-operate mode is also set upon receipt of an optical disk into the drive. The non-operate mode prevents accessing any optical disk present in the drive. The operate mode enables disk accessing. In the non-operate condition, the only receivable command is a mode setting command. Such mode setting command establishes control states within the optical disk drive. Such control states in an illustrated embodiment of the present invention includes selecting whether or not a write verify operation is performed for each recording operation and whether or not a laser is to be turned off a predetermined time after completion of the command unless another command received after a power-on sequencing with a disk present or after receipt of an optical disk into the drive is received before the time has elapsed. Once a mode set command sets the mode state to operate, any legal command can be received.

The foregoing and other objects, features and advantages of the invention will be apparent from the following more particular description of preferred embodiments of the invention, as illustrated in the accompanying drawings.

BRIEF DESCRIPTION OF THE DRAWINGS

FIG. 4 is an abbreviated machine-operations chart showing control of the optical disk drive during power-on, power on reset and whenever a new disk is inserted into the drive.

FIG. 5 is an abbreviated machine-operations chart showing the execution of machine-operations in practicing the present invention in the FIG. 1 illustrated optical disk drive.

FIG. 6 is an abbreviated machine-operations chart showing the operations when a disk is ejected from the optical disk drive of FIG. 1.

FIG. 7 shows a time out control useable in the FIG. 1 illustration in connection with practicing the present invention.

DETAILED DESCRIPTION OF THE DRAWINGS

Figure 1:
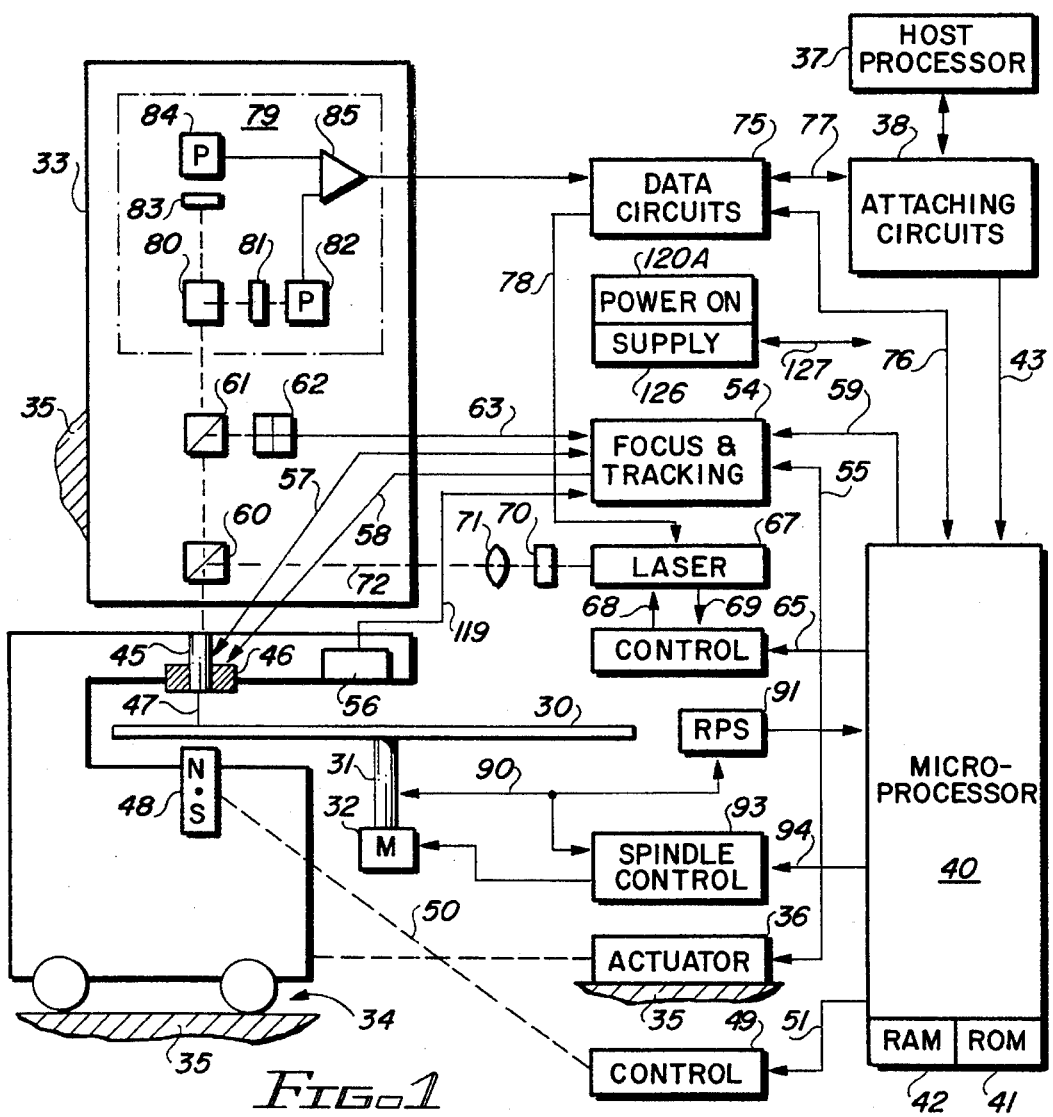
FIG. 1 is an abbreviated block-diagram of an optical disk drive in which the present invention is advantageously employed.

Referring now more particularly to the appended drawings, like numerals indicate like parts and structural features in the various figures. Before going into the details of how the procedures and criteria are effected in accordance with the present invention, the environment in which the present invention is advantageously practiced is shown in FIG. 1. A magnetooptic record disk 30 is mounted for rotation on spindle 31 by motor 32. Optical portion 33 is mounted on frame 35. A headarm carriage 34 moves radially of disk 30 for carrying an objective lens 45 from track to track. A frame 35 of recorder suitably mounts carriage 34 for reciprocating radial motions. The radial motions of carriage 34 enable access to any one of a plurality of concentric tracks or circumvolutions of a spiral track for recording and recovering data on and from the disk. Linear actuator 36 suitably mounted on frame 35, radially moves carriage 34 for enabling track accessing. The recorder is suitably attached to one or more host processors 37, such host processors may be control units, personal computers, large system computers, communication systems, image signal processors, and the like. Attaching circuits 38 provide the logical and electrical connections between the optical recorder and the attaching host processors 37.

Microprocessor 40 controls the recorder including the attachment to the host processor 37. Control data, status data, commands and the like are exchanged between attaching circuits 38 and microprocessor 40 via bidirectional bus 43. Included in microprocessor 40 is a program or microcode-storing, read-only memory (ROM) 41 and a data and control signal storing random-access memory (RAM) 42.

The optics of the recorder include an objective or focusing lens 45 mounted for focusing and radial tracking motions on headarm 33 by fine actuator 46. This actuator includes mechanisms for moving lens 45 toward and away from disk 30 for focusing and for radial movements parallel to carriage 34 motions; for example, for changing tracks within a range of 100 tracks so that carriage 34 need not be actuated each time a track adjacent to a track currently being accessed is to be accessed. Numeral 47 denotes a two-way light path between lens 45 and disk 30.

In magnetooptic recording, magnet 48 in a constructed embodiment (magnet 48 is an electromagnet) provides a weak magnetic steering field for directing the remnant magnetization direction of a small spot on disk 30 illuminated by laser light from lens 45. The laser light spot heats the illuminated spot on the record disk to a temperature above the Curie point of the magnetooptic layer (not shown, but can be an alloy of rare earth and transitional metals as taught by Chaudhari et al., U.S. Pat. No. 3,949,387). This heating enables magnet 48 to direct the remnant magnetization to a desired direction of magnetization as the spot cools below the Curie point temperature. Magnet 48 is shown as oriented in the "write" direction, i.e., binary ones recorded on disk 30 normally are "north pole remnant magnetization". To erase disk 30, magnet 48 rotates so the south pole is adjacent disk 30. Magnet 48 control 49, which is operatively coupled to rotatable magnet 48 as indicated by dashed line 50, controls the write and erase directions. Microprocessor 40 supplies control signals over line 51 to control 49 for effecting reversal of the recording direction.

It is necessary to control the radial position of the beam following path 47 such that a track or circumvolution is faithfully followed and that a desired track or circumvolution is quickly and precisely accessed. To this end, focus and tracking circuits 54 control both the coarse actuator 36 and fine actuator 46. The positioning of carriage 34 by actuator 36 is precisely controlled by control signals supplied by circuits 54 over line 55 to actuator 36. Additionally, the fine actuator 46 control by circuits 54 is exercised through control signals travelling to fine actuator 46 over lines 57 and 58, respectively for effecting respective focus and track following and seeking actions. Sensor 56 senses the relative position of fine actuator 46 to headarm carriage 33 to create a relative position error (RPE) signal. Line 57 consists of two signal conductors, one conductor for carrying a focus error signal to circuits 54 and a second conductor for carrying a focus control signal from circuits 54 to the focus mechanisms in fine actuator 46.

The focus and tracking position sensing is achieved by analyzing laser light reflected from disk 30 over path 47, thence through lens 45, through one-half mirror 60 and to be reflected by half-mirror 61 to a so-called "quad detector" 62. Quad detector 62 has four photoelements which respectively supply signals on four lines collectively denominated by numeral 63 to focus and tracking circuits 54. Aligning one axis of the detector 62 with a track center line, track following operations are enabled. Focusing operations are achieved by comparing the light intensities detected by the four photoelements in the quad detector 62. Focus and tracking circuits 54 analyze the signals on lines 63 to control both focus and tracking.

Recording or writing data onto disk 30 is next described. It is assumed that magnet 48 is rotated to the desired position for recording data. Microprocessor 40 supplies a control signal over line 65 to laser control 66 for indicating that a recording operation is to ensue. This means that laser 67 is energized by control 66 to emit a high-intensity laser light beam for recording; in contrast, for reading, the laser 67 emitted laser light beam is a reduced intensity for not heating the laser illuminated spot on disk 30 above the Curie point. Control 66 supplies its control signal over line 68 to laser 67 and receives a feedback signal over line 69 indicating the laser 67 emitted light intensity. Control 68 adjusts the light intensity to the desired value. Laser 67, a semiconductor laser, such as a gallium-arsenide diode laser, can be modulated by data signals so the emitted light beam represents the data to be recorded by intensity modulation. In this regard, data circuits 75 (later described) supply data indicating signals over line 78 to laser 67 for effecting such modulation. This modulated light beam passes through polarizer 70 (linearly polarizing the beam), thence through collimating lens 71 toward half mirror 60 for being reflected toward disk 30 through lens 45. Data circuits 75 are prepared for recording by the microprocessor 40 supplying suitable control signals over line 76. Microprocessor 40 in preparing circuits 75 is responding to commands for recording received from a host processor 37 via attaching circuits 38. Once data circuits 75 are prepared, data is transferred directly between host processor 37 and data circuits 75 through attaching circuits 38. Data circuits 75, also ancillary circuits (not shown), relating to disk 30 format signals, error detection and correction and the like. Circuits 75, during a read or recovery action, strip the ancillary signals from the readback signals before supply corrected data signals over bus 77 to host processor 37 via attaching to 38.

Reading or recovering data from disk 30 for transmission to a host processor requires optical and electrical processing of the laser light beam from the disk 30. That portion of the reflected light (which has its linear polarization from polarizer 70 rotated by disk 30 recording using the Kerr effect) travels along the two-way light path 47, through lens 45 and half-mirrors 60 and 61 to the data detection portion 79 of the headarm 33 optics. Half-mirror or beam splitter 80 divides the reflected beam into two equal intensity beams both having the same reflected rotated linear polarization. The half-mirror 80 reflected light travels through a first polarizer 81 which is set to pass only that reflected light which was rotated when the remnant magnetization on disk 30 spot being accessed has a "north" or binary one indication. This passed light impinges on photocell 82 for supplying a suitable indicating signal to differential amplifier 85. When the reflected light was rotated by a "south" or erased pole direction remnant magnetization, then polarizer 81 passes no or very little light resulting in no active signal being supplied by photocell 82. The opposite operation occurs by polarizer 83 which passes only "south" rotated laser light beam to photocell 84. Photocell 84 supplies its signal indicating its received laser light to the second input of differential amplifier 85. The amplifier 85 supplies the resulting difference signal (data representing) to data circuits 75 for detection. The detected signals include not only data that is recorded but also all of the so-called ancillary signals as well. The term "data" as used herein is intended to include any and all information-bearing signals, preferably of the digital or discrete value type.

The rotational position and rotational speed of spindle 31 is sensed by a suitable tachometer or emitter sensor 90. Sensor 90, preferably of the optical-sensing type that senses dark and light spots on a tachometer wheel (not shown) of spindle 31, supplies the "tach" signals (digital signals) to RPS circuit 91 which detects the rotational position of spindle 31 and supplies rotational information-bearing signals to microprocessor 40. Microprocessor 40 employs such rotational signals for controlling access to data storing segments on disk 30 as is widely practiced in the magnetic data storing disks. Additionally, the sensor 90 signals also travel to spindle speed control circuits 93 for controlling motor 32 to rotate spindle 31 at a constant rotational speed. Control 93 may include a crystal-controlled oscillator for controlling motor 32 speed, as is well known. Microprocessor 40 supplies control signals over line 94 to control 93 in the usual manner.

Power supply 126 supplies, as indicated by double-headed arrow 127, the usual power for operating the FIG. 1 illustrated optical disk device. Power-on circuits 120A automatically sequence on the supply 126 in a usual manner. Power-on circuits 120A correspond to step 120 of FIG. 4.

Figure 2:
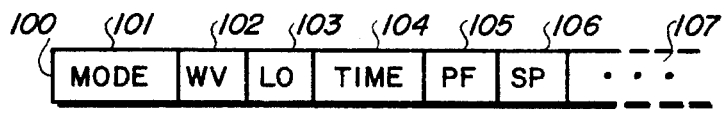
FIG. 2 illustrates diagrammatically a mode setting command.

Referring next to FIG. 2, a mode setting command used in practicing the present invention is shown. The command 100 includes an operation code field 101 which indicates it is a mode set command. Field WV 102 contains a binary zero whenever no write verify is required while a binary one indicates a write verify is to be used. Field LO 103 indicates whether or not the laser should be turned off upon completion of a command execution by the FIG. 1 illustrated optical disk drive. Binary zero indicates a laser should be left on continuously while a binary one indicates it should be turned off. Field time 104 indicates the delay in turning off the laser upon completion of a command. In all zeros in the field 104 indicate the laser should be turned off immediately upon completion of any command. While a non-zero number up to the modulus of the field minus one indicates the time in seconds for the device to keep the laser turned on, at the modulus value (all ones) the laser is always left on. Laser always on can be a default at the power-on sequencing. The non-zero number less than the modulus activates a FIG. 1 illustrated drive to keep the laser powered on preferably at a low level used for track following and seeking. It also could be left on at the reading value. Additionally, for erasing there is a higher powered laser operation for that operation and a yet higher powered for recording or writing. Field PF 105 is a page format bit which is set to one for indicating that data sent in the mode select command uses a so-called page format. A field SP 106 is a save parameter bit which is set to zero (inactive) which indicates that the optical disk drive of FIG. 1 shall not save the pages sent during a data outphase to the drive. Numeral 107 identifies an ellipsis indicating that a mode set command may contain other controller information for use by the FIG. 1 illustrated optical disk drive.

Figure 3:
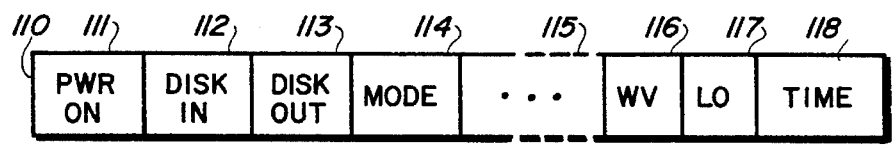
FIG. 3 illustrates in diagrammatic form control data structures within the optical disk drive of FIG. 1 used in implementing the present invention.

FIG. 3 illustrates the internal data structure 110 within the RAM 42 of microprocessor 40 for implementing the present invention. It is to be understood that RAM 42 contains additional data structures for controlling the operation of the FIG. 1 illustrated drive not shown in the present application.

The field PWR ON 111 indicates that power has been turned on but no mode set command has been received. The field DISK IN 112 indicates a disk has been inserted into or is present at the completion of power-on sequencing in the drive but no mode set command has been received. The field DISK OUT 113 indicates there is currently no disk in the FIG. 1 optical disk drive.

Field MODE 114 indicates a mode set command has been received. Numeral 115 indicates that additional control bits may be used in the data structure 110. Field WV 116 indicates that the mode set command has either required or dispensed with the verify operation of a write command received with the last mode set command 100. The LO bit 117 indicates whether or not the laser is to be turned off after completion of a executed command while the time field 118 indicates the elapsed time required as above described.

FIG. 4 shows operations performed in response to insertion of a disk into the FIG. 1 illustrated disk drive and a power-on sequence for powering-on the FIG. 1 illustrated disk drive. Numeral 120 denotes a set power-on sequence which can be of usual set of machine-operations. At step 121 it is determined whether or not a disk has been inserted into the FIG. 1 illustrated disk drive (a disk is present in the disk drive). If not, power on sequencing for powering-on the FIG. 1 illustrated disk drive continues over path 122. If a disk is inserted and is currently lodged in the FIG. 1 illustrated optical disk drive, the step 121 occurs at the termination of the power-on sequencing. Then at machine step 124 the DISK IN field 112 is set to unity, DISK OUT 113 is reset, MODE bit 114 is reset, and the fields 116–118 are reset, i.e., cleared to a reference state such as all zeros. A disk present in the FIG. 1 illustrated drive (DISK IN=1) and POWER-ON field bit 111 is unity, then the non-operate mode exists. The non-operate mode prevents accessing the disk until after a mode set command is received. Step 126 detects insertion of a disk into the drive after power-on as indicated by arrow 125. Numeral 125 indicates insertion of an optical disk into the FIG. 1 illustrated optical disk drive. Step 126 detects the insertion of an optical disk for actuating performance of steps 124 et, seq as described above.

FIG. 5 shows the operation of the invention as automatically performed in the FIG. 1 illustrated drive. A command is received at machine-step 130 from host processor 37. At step 131 a timer in RAM 42 (typical software timer) is reset through a reference value and the timer counter is disabled. At step 132 microprocessor 40 determines whether or not the received command is a mode setting command. If yes, then at machine step 133 the MODE bit 114 is set, the POWER ON field bit 111 is reset to zero and the CONTROL fields 116–118 are set to the contents of the fields 102–104 of MODE SET command 100. Then at machine-step 134, final status is reported. At machine-step 135, microprocessor 40 examines the field LO 117 to determine if the laser should be turned off after expiration of a predetermined time out. If yes, then at step 136 the time is set and timer is turned on in the usual manner. Then at step 137 other machine processes are performed which are beyond the present description. If the laser is not to be turned off at step 135 (Time 118=FFFF), then the laser is left on as indicated by numeral 139 followed by other operations indicated by numeral 137 are immediately entered. At step 135, when timer 118=0000 then the laser 67 at step 138 is immediately turned off at the completion of the current command execution.

When no mode set command was received after a power-on sequence or disk insertion or receipt and prior to the command received at step 130; then step 140 determines whether or not the just-received command is a mode set command. If the just-received command is not a mode set command, then in a preferred form of the invention, the just-received command is rejected at step 141. In the non-operate mode rejecting a command prevents accessing disk 30 until a mode set command has been received. Then steps 134 et seq are performed. In some implementations of the invention, the FIG. 1 illustrated drive has default operating values such as write verify is active (WV 116=1) and the laser 67 is continuously on (LO=0). In this latter implementation, steps 140 and 141 are dispensed with.

The step 130 received command is executed at step 142. For each write command with WV 116=1, write verify operation 143 is performed in a usual manner.

FIG. 6 show that at machine-step 150 a ejection of a disk is detected, i.e., the disk may be manually ejected rather than automatically. In any event, at step 151 the laser is turned off, then at step 152 the DISK OUT bit 113 is set and the DISK IN bit 112 is reset. Other operations then ensue.

FIG. 7 illustrates setting a timer for timing out a delay before turning off laser 60 after completion of a disk access. At step 161, microprocessor 40 determines whether or not the timer has timed out. If not, other operations ensue as indicated by numeral 162. If the timer has timed out, then at step 163 microprocessor 40 examines LO bit 117. If LO bit 117 is a zero, the timing out is of no significance. If LO bit 117 is non-zero or a one, then at step 164 the laser is turned off. From either step 163 or step 164 other operations ensue, as indicated by numeral 165.

While the invention has been particularly shown and described with reference to preferred embodiments thereof, it will be understood by those skilled in the art that various changes in form and details may be made therein without departing from the spirit and scope of the invention:

What is claimed is:

1. An optical disk drive for exchanging data signals with an optical disk mounted for rotation at a play position in the optical disk drive, rotation means in the optical disk drive for rotating the optical disk, a laser in the optical disk drive that can be turned on to shine a light beam directed to impinge on an recording surface of the optical disk and that can be turn off, said optical disk drive having attachment means for connecting to an external host processor for receiving host-processor issued commands that command the optical disk drive to write data on and read data from a disk in the play position and to control the laser, means connected to the optical disk for continuously rotating the disk at said play position, a laser on-off control connected to the laser for turning the laser on and off;

the improvement including, in combination:

receiving means connected to the attachment means for receiving said host-processor issued commands to actuate the optical disk drive for writing data on and reading data from the optical disk;

command execution means in the optical disk drive connected to the command receiving means for responding to each of the received host-processor issued commands for actuating the drive to execute the received host-processor issued command, said command execution means having means for indicating completion of each execution of each said host-processor issued command;

mode control means connected to said laser on-off control and to said command execution means for receiving a mode setting command that indicates leaving said laser continuously on or turning said laser off after completing an execution of any subsequently received commands from said host-processor then turning said laser on upon receipt of a read or write command, said mode control means storing an indication of whether said laser is to be left on continuously or turned off after completing execution of said any subsequent command, said mode control means initially setting a mode indication to leave the laser on continuously and being responsive to said mode setting command indicating turn off the laser set said mode indication to indicate turn off the laser after completing a received host processor command;

means in the command execution means and connected to the mode control means, to the receiving means and to said laser on-off control for responding to said indication of completion of each execution of each said received host-processor issued command for examining said mode indication for responding to the mode indication indicating turn off the laser for actuating the laser on-off control to turn the laser off while said rotation means continues to rotate the optical disk.

2. The apparatus set forth in claim 1, further including, in combination:

a timer for timing a predetermined elapsed time and for supplying a time-out signal upon timing said predetermined set elapsed time.

3. In the apparatus set forth in claim 2 further including, in combination:

said mode setting command including an indication of a desired elapsed time; and said command execution means responding to said mode-setting command to set the timer to time out an elapsed time equal to said desired elapsed time.

4. A method of operating an optical disk drive that has means for receiving and supporting an optical disk in a play position of the optical disk drive, a laser that can be turned on and off for emitting a laser beam to the optical disk in the play position and attachment means for receiving host-processor issued commands, some of said host-processor issued commands actuating said optical disk drive to write data to or read data from the optical disk, including tile steps:

detecting and indicating that the disk is in the play position;

responding to said indicating that the disk is in the play position for turning the laser on;

leaving the laser on continuously;

receiving a mode-setting host-processor issued command that commands turning the laser off each time after completing execution of any one of said received host-processor issued commands;

responding to the mode-setting host-processor issued command to set a laser control bit in the optical disk drive for indicating that the laser is to be turned off upon completing execution of any said host-processor issued command that reads data from or writes data to said optical disk; and upon completing execution of each received host-processor issued command to sense the laser control bit for responding to the laser control bit being set to turn the laser off after each said completing execution of a host-processor issued command that read data from or wrote data to said optical disk.

5. In the machine-effected method set forth in claim 4 further including the steps:

responding to said completion of each executing each received host-processor issued command that read data from or wrote data to said optical disk to time a predetermined elapsed time before turning the laser off.

6. In the machine-effected method set forth in claim 5, wherein said mode-setting host-processor issued command contains an indication of a given elapsed time, further including the steps:

receiving said mode-setting host-processor issued command for responding to said indication of a given elapsed time to set said predetermined elapsed time to be equal to said given elapsed time.

* * * * *